United States Patent
Hogan (12) 
(10) Patent No.: US 6,474,061 B1
(45) Date of Patent: Nov. 5, 2002

(54) WATER PRESSURE DRIVEN GENERATOR

(76) Inventor: Michael G. Hogan, 3501 Champion Lake Blvd., #184, Shreveport, LA (US) 71105

( * ) Notice: Subject to any disclaimer, the term of this patent is extended or adjusted under 35 U.S.C. 154(b) by 0 days.

(21) Appl. No.: 09/721,358

(22) Filed: Nov. 22, 2000

(51) Int. Cl.[7] .......................... F16D 33/00; F04C 15/00
(52) U.S. Cl. .......................... 60/325; 60/413; 418/143; 418/142
(58) Field of Search .......................... 60/398, 325, 413, 60/455, 485; 415/182.1, 202; 418/61.2, 58, 61.1, 236, 113, 125, 143

(56) References Cited

U.S. PATENT DOCUMENTS

| | | | |
|---|---|---|---|
| 964,837 A | * 7/1910 | Austin | 415/202 X |
| 1,160,032 A | * 11/1915 | Allan | 60/485 X |
| 1,414,984 A | * 5/1922 | Hood | 415/202 X |
| 2,097,166 A | * 10/1937 | Stone | 60/398 X |
| 3,676,015 A | * 7/1972 | Hodgman, Jr. | 415/202 |
| 3,762,842 A | * 10/1973 | George, Jr. | 418/61.2 |
| 3,825,375 A | * 7/1974 | Deane | 418/61.2 |
| 3,847,514 A | * 11/1974 | Chen et al. | 418/61.2 X |
| 4,047,856 A | * 9/1977 | Hoffman | 418/61.2 |
| 4,137,024 A | * 1/1979 | Jones | 418/61.2 |
| 4,142,367 A | * 3/1979 | Guisti | 60/325 |
| 4,607,169 A | * 8/1986 | Donnelly, Jr. | 290/54 |
| 5,144,802 A | * 9/1992 | Ruzic | 418/15 X |
| 5,310,325 A | * 5/1994 | Gulyash | 418/61.2 |
| 6,070,409 A | * 6/2000 | Kaiser | 60/512 |
| 6,168,405 B1 | * 1/2001 | Nosenchuck | 418/61.2 |

OTHER PUBLICATIONS

Wankel Rotory Engine.

* cited by examiner

Primary Examiner—John E. Ryznic
(74) Attorney, Agent, or Firm—Jones, Walker, Waechter, Poitevent, Carrere & Denegre, L.L.P.

(57) ABSTRACT

A fluid pressure driven generator which includes a generator housing and a rotor positioned within the generator housing. The rotor will have an internal offset gear which is engaged by a spur gear on a power shaft. A high fluid pressure inlet will be formed in the housing and connected to a source of high pressure fluid. The housing will also have low pressure outlet which will feed a source of low pressure fluid.

21 Claims, 7 Drawing Sheets

Section A-A

WATER PRESSURE DRIVEN GENERATOR

1. BACKGROUND OF INVENTION

The present invention relates to generators driven by water or other fluids and more particularly to a generator which may be driven by water pressures typically found in municipal water lines. The invention also relates to a generator for use in a hybrid mobile vehicle wherein the generator can be driven by water (or other fluids) pressurized by any conventional method.

Municipal water systems typically pressurize water in system's lines to around 70 psi to 90+ psi. While a water pressure of approximately 20 psi to 40 psi is largely adequate for most end-user's purposes, the higher pressure is maintained for peak water demands or emergency (e.g. fire) water demands. This means that 70 psi to 30 psi of unneeded excess water pressure normally exists in most water lines. To the inventor's knowledge, there has been no attempt in the prior art to recover useful power from this excess water pressure. It would be a significant advance in the art to provide an apparatus and method which are capable of recovering useful power from pressurized water lines.

2. SUMMARY OF THE INVENTION

The present invention will operate in principle by recovering power stored in the higher pressure water (or another fluid) and then returning lower pressure water (albeit at sufficient pressure for most commercial or domestic uses to a low pressure water supply. Therefore, the present invention provides a water pressure driven generator. The generator will include a generator housing and a rotor positioned within the generator housing. The rotor will have an internal offset gear which is engaged by a spur gear on a power shaft. A high-pressure water inlet will be formed in the housing and connected to a source of high-pressure water. The housing will also have low-pressure outlet which will discharge a flow of low-pressure water.

In addition, the invention is readily adaptable for generating significant torque drive in hybrid mobile vehicles where the hybrid vehicle utilizes an alternative power source for water (or another fluid) pressure and for water recirculation. In such a hybrid mobile vehicle, water pressures of 100 psi or more can be employed. Also, the invention is readily adaptable for use in generating power at any decentralized site where pressurized water (or another fluid) is made available.

4. DETAILED DESCRIPTION OF THE INVENTION

Figure 1:
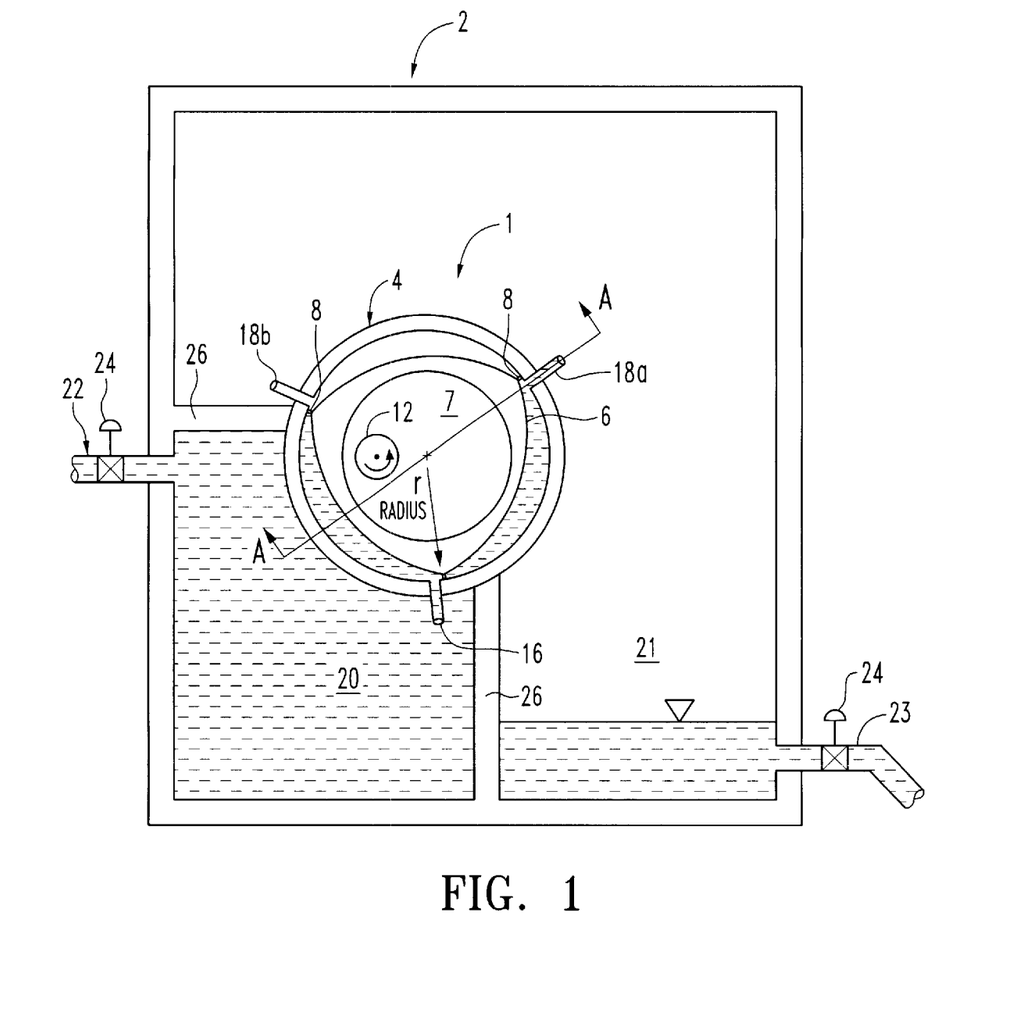
FIG. 1 is a cross-sectional view of the water pressure driven generator of the present invention.

FIG. 1 illustrates the water pressure driven generator 1 enclosed in a pressure chamber 2. Pressure chamber 2 will include a high pressure section 20 which is separated from low pressure section 21 by walls 26. A high-pressure water source 22 will be connected to high pressure section 20 by way of a valve 24. The low pressure section 21 will serve as a supply of low-pressure water which is connected to low pressure supply line 23 by way of another valve 24. As used in reference to the figures, a "high pressure water source" is generally considered the pressure level most commonly found in conventional municipal water supply systems. Commonly this pressure ranges from 70 pounds per square inch (psi) to 90 or greater psi, but could include greater pressure ranges such as 50 psi to 150 psi (or even greater fluid pressures). While pressures of higher than 150 psi are not typically found in residential and commercial water supply systems, there may be specialized uses of the present invention which would utilize pressures over 150 psi (such as in hybrid mobile vehicles and other applications). The "low pressure water supply" will generally be water at a pressure considered sufficient for most residential or commercial uses, such as 20 psi to 30 psi. However, the use of the present invention is not limited to any particular pressure range, but only requires a sufficient pressure differential across the system to allow the generator to function as described herein. Additionally, while the embodiments seen in the Figures are generally powered by pressurized water, the scope of the present invention also includes devices and methods powered by fluids other than water.

The water pressure driven generator 1 seen in FIG. 1 will be positioned in pressure vessel 2 in such a way as to form part of the structure dividing high pressure section 20 and low pressure section 21. A circular wall will form the hollow generator housing 4. Housing 4 will interface with walls 26 to complete the separation of high-pressure section 20 and low pressure section 21. Two low-pressure outlets 18a and 18b will be formed in housing 4 and will communicate with low pressure section 21. A high-pressure inlet 16 will be formed in housing 4 at a location where inlet 16 will communicate with high pressure section 20. In the embodiment shown in FIG. 1, inlet 16, outlet 18a and outlet 18b are spaced apart approximately 120° around the circumference of housing 4.

Figure 2:
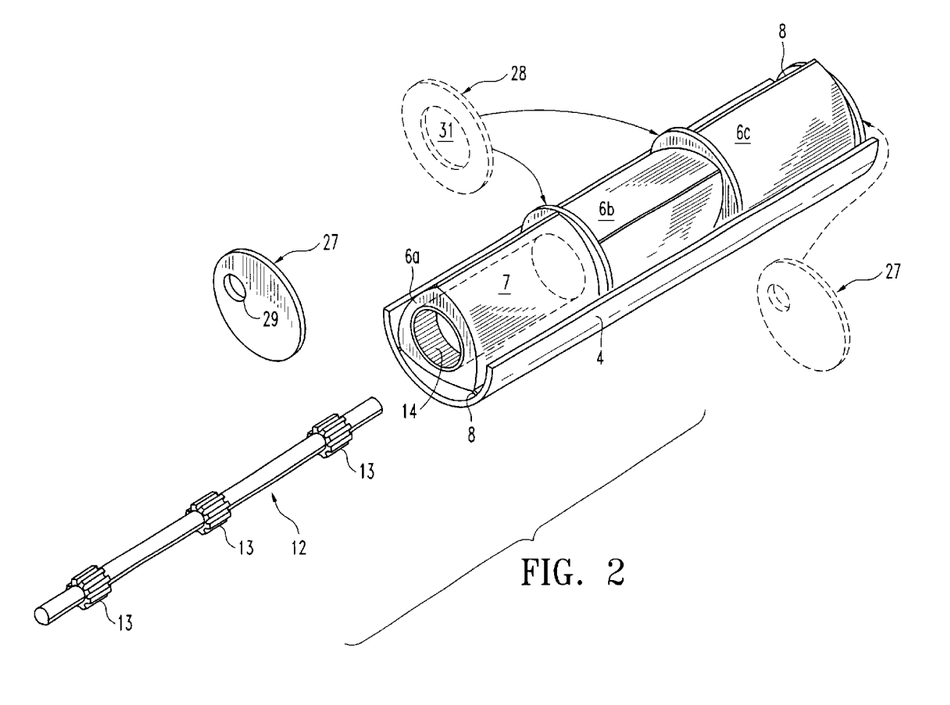
FIG. 2 is a perspective view of the generator housing and rotors.

Positioned within housing 4 will be a rotor 6 with a hollow center cavity 7 formed therein. A power shaft 12 will be positioned within center cavity 7. The manner in which rotor 6 is positioned in housing 4 is better seen in FIG. 2, which illustrates generator 1 removed from pressure vessel 2 and part of housing 4 removed to provide a better view of rotor 6. The rotor 6 seen in FIG. 2 is a trocoidal shaped cylinder which has equilateral triangular outer surfaces. Formed on an internal surface at one end of cavity 7 is the circular track of the internal gear 14. Internal gear 14 is designed to engage spur gear 13 which is formed on power shaft 12. As suggested in FIG. 2, an end section 27 will fit over the front of housing 4 and form a substantially water tight rotating seal (described below) with housing 4. End section 27 will include an offset shaft aperture 29 through which power shaft 12 may extend. While not explicitly shown, it will be understood that any conventional bearing system may be employed to allow power shaft 12 to rotate freely in shaft aperture 29. Shaft aperture 29 is offset in a manner which will position spur gear 13 in mechanical engagement with internal gear 14 when power shaft 12 is positioned within cavity 7. It will be understood the rotation of rotor 6 will cause internal gear 14 to impart torque to spur gear 13 and therefore provide power to shaft 12. FIG. 2 illustrates how a plurality of rotors 6 may be positioned in series. Mid-section dividers 28 having center openings 31 will be positioned between the rotors 6. Center openings 31 will be fixed to and sealed with center cavities 7 of rotors 6. This insures fluid will not be able to flow into center cavities from the exterior of rotors 6. It also insures mid-section dividers 28 will rotate with rotors 6. It also ensures that water (or other fluids) will not flow between rotors 6. The continuous path through center cavities 7 and center openings 31 will also allow power shaft 12 to extend through successive rotors 6. While not seen in FIG. 2, it will be understood that each rotor 6 will have an internal gear 14 to mate with the successive spur gears 13 seen on power shaft 12.

Figure 3A:
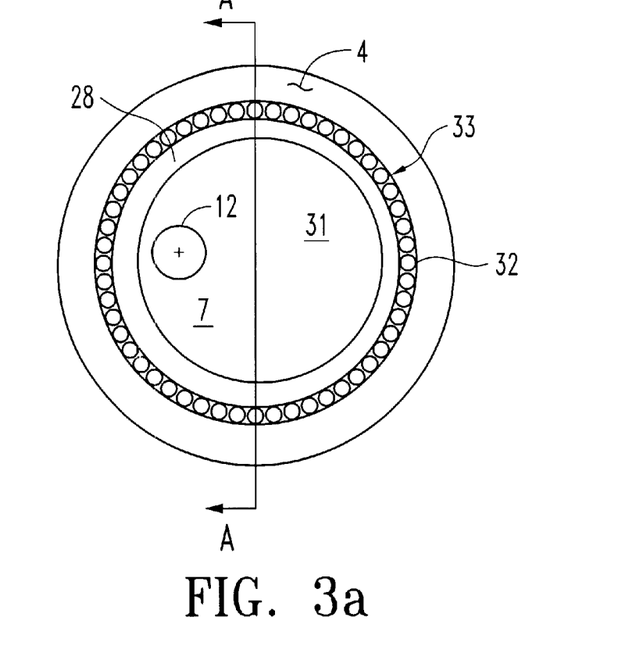
FIGS. 3a and 3b are different views of one rotating seal which may be used in the present invention.
Figure 3B:
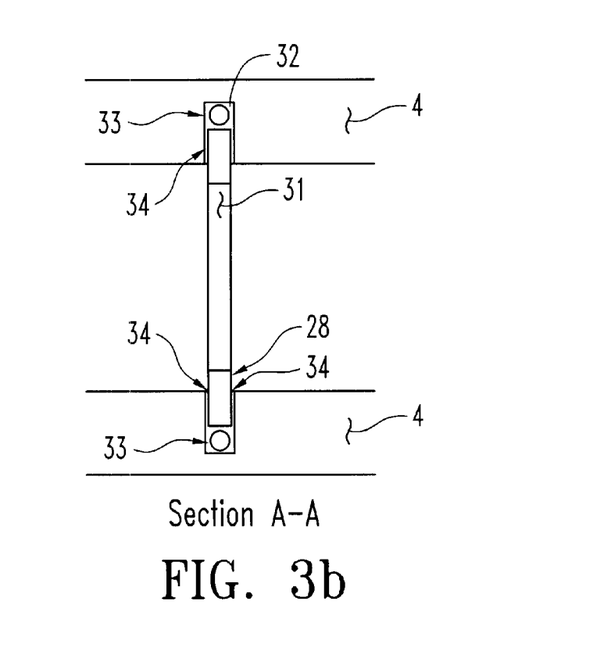

End sections 27 and mid-section dividers 28 will form a rotating seal against housing 4 and will rotate in conjunction with rotors 6. FIGS. 3a and 3b illustrate one embodiment of the rotating seal. FIG. 3a is a front view of a mid-section divider 28 positioned within housing 4. FIG. 3b is a side view taken at section A—A of the same mid-section divider 28. It can be seen that a ball bearing track 32 is formed in housing 4. FIG. 3b shows how the outer edges of mid-section divider 28 will be supported in track 32 by ball bearings 33. To minimize fluid leakage from one side of mid-section divider 28 to the next side, a conventional gasket material 34 will be positioned between the sidewalls of track 32 and the edge of mid-section divider 34. Gasket material 34 will effectively seal against water but will not significantly hinder free rotation of mid-section divider 34 (and thus rotor 6). While not explicitly shown, end sections 27 will form similar rotating seals with housing 4. It can be understood how end sections 27 and mid-sections dividers 28. being fixed to rotors 6, form bearing surfaces which allow rotors 6 to rotate in housing 4. Viewing FIG. 2, it will be understood that each rotor 6 is positioned in a separate pressure chamber formed between an end section 27 and a mid-section divider 28 or between two successive mid-section dividers 28.

Figures 4A, 4B:
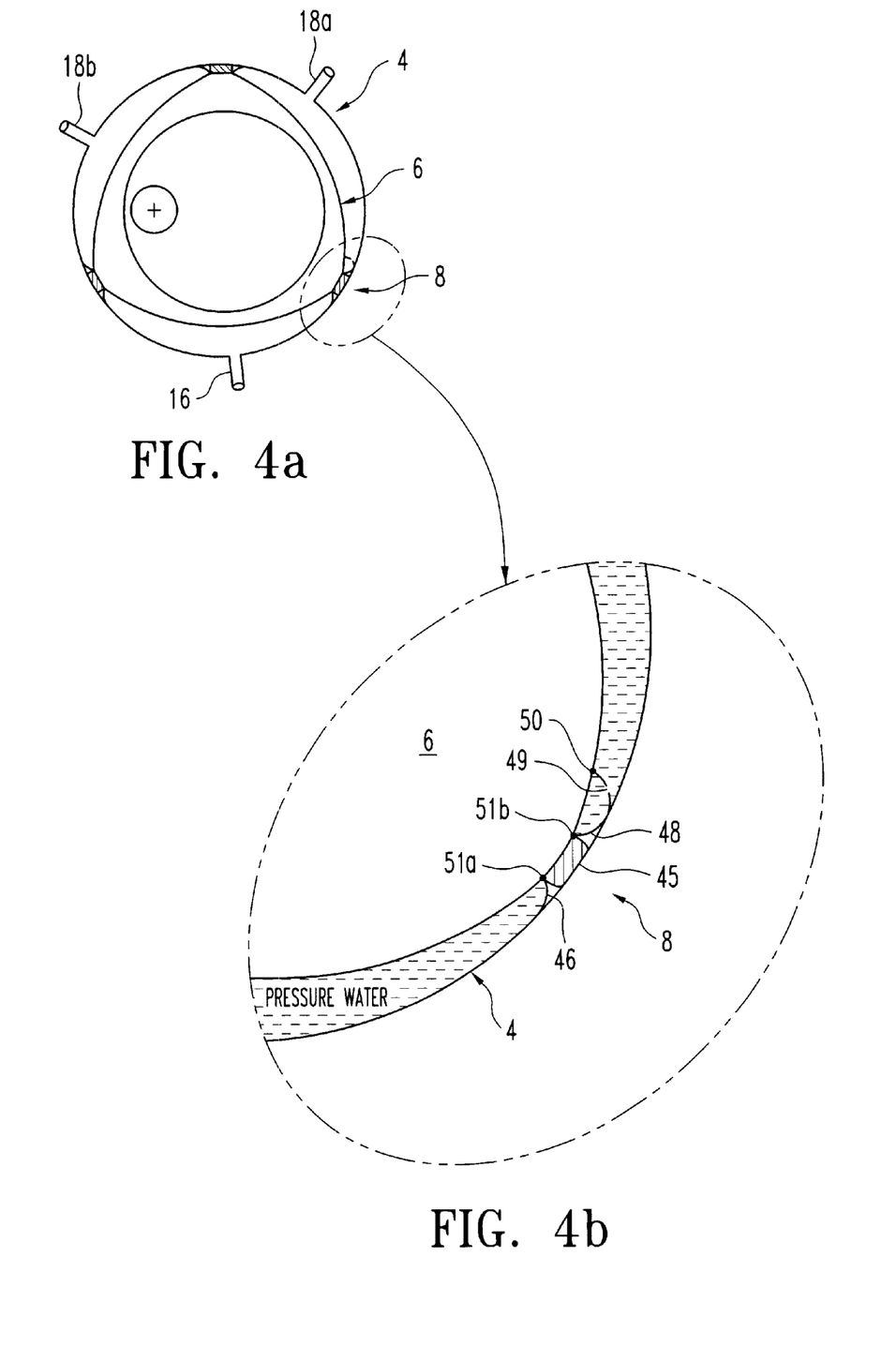
FIGS. 4a and 4b are different views of one rotor seal which may be used in the present invention.

FIGS. 1 and 2 illustrate how a seal 8 will be positioned on the apices of each rotor 6. Seal 8 will engage the inner surface of housing 4 in order to prevent water from freely flowing between the apices of rotors 6 and the inner surface of housing 4. The importance of this will be seen below in reference to FIG. 6. As suggested in FIG. 2, seal 8 will run along the apices of rotor 6 for the entire length of rotor 6. One preferred embodiment of seal 8 is better seen in FIGS. 4a and 4b. An enlarged view of one embodiment of seal 8 can be seen in FIG. 4b. Seal 8 will include a rectangular gasket 45 and two membrane flaps 46 and 48. Rectangular gasket 45 will be a roughly rectangular section (but could be other shapes) of rubber or similar material which is attached at the apices of rotor 6 and sealingly slides along the interior wall of housing 4. Preferably, rectangular gasket 45 is sufficiently wide to momentarily cover inlet 16 and outlets 18 (see FIG. 1) as the rectangular gasket 45 rotates past these inlet and outlet openings. Attached adjacent to rectangular gasket 45 are membrane flaps 46 and 48. It is noted that membrane flaps 46 and 48 are configured to operate with a rotor 6 rotating in the counter-clockwise direction with high pressure water on the left side of seal 8 and low pressure water on the right side of seal 8. These membrane flaps will also be formed of a flexible rubber-like material. One end of membrane flap 46 will be attached to rotor 6 at attachment point 51a. The other end will drape down and slide along the interior of wall of housing 4. It can be seen that if the high pressure water tends to leak under rectangular gasket 45, this will tend to force membrane flap 46 to flatten against the interior wall of housing 4, thereby forming a secondary seal (rectangular gasket 45 being the primary seal) which seals with a force proportional to the pressure drop across the seal. Membrane flap 48 is formed somewhat differently than membrane flap 46. Membrane flap 48 is attached at one end to point 51b and at its other end at point 50. This is because rotor 6 will be rotating in the counter-clockwise direction as discussed above. If one end of membrane flap 48 was left loose as is done in regards to membrane flap 46, that end of membrane flap 48 could become entangled with rectangular gasket 45 as it rotates toward that flap. Additionally, membrane flap 48 will have a series of apertures 49 formed in the flap to insure water pressure above the flap tends to force the flap to seal against housing 4.

FIG. 2 also illustrates how adjacent rotors 6 will have an angular offset. It can be seen that rotor 6b is offset from rotors 6a and 6c. As is explained in more detail below, the offset nature of power shaft 12 results in rotor 6a providing different amounts of torque at different stages in its rotation. By positioning rotor 6b at an angular offset, rotor 6b will be able to provide higher torque to power shaft 12 when rotor 6a is in its low torque position. Naturally, the reverse it also true in that when 6b is in a low torque position, rotors 6a will be in a position to provide higher torque. In the embodiment shown, the angular offset between rotor 6a and rotor 6b is approximately 60°. However, those skilled in the, art may select varying offset angles.

Figure 5:
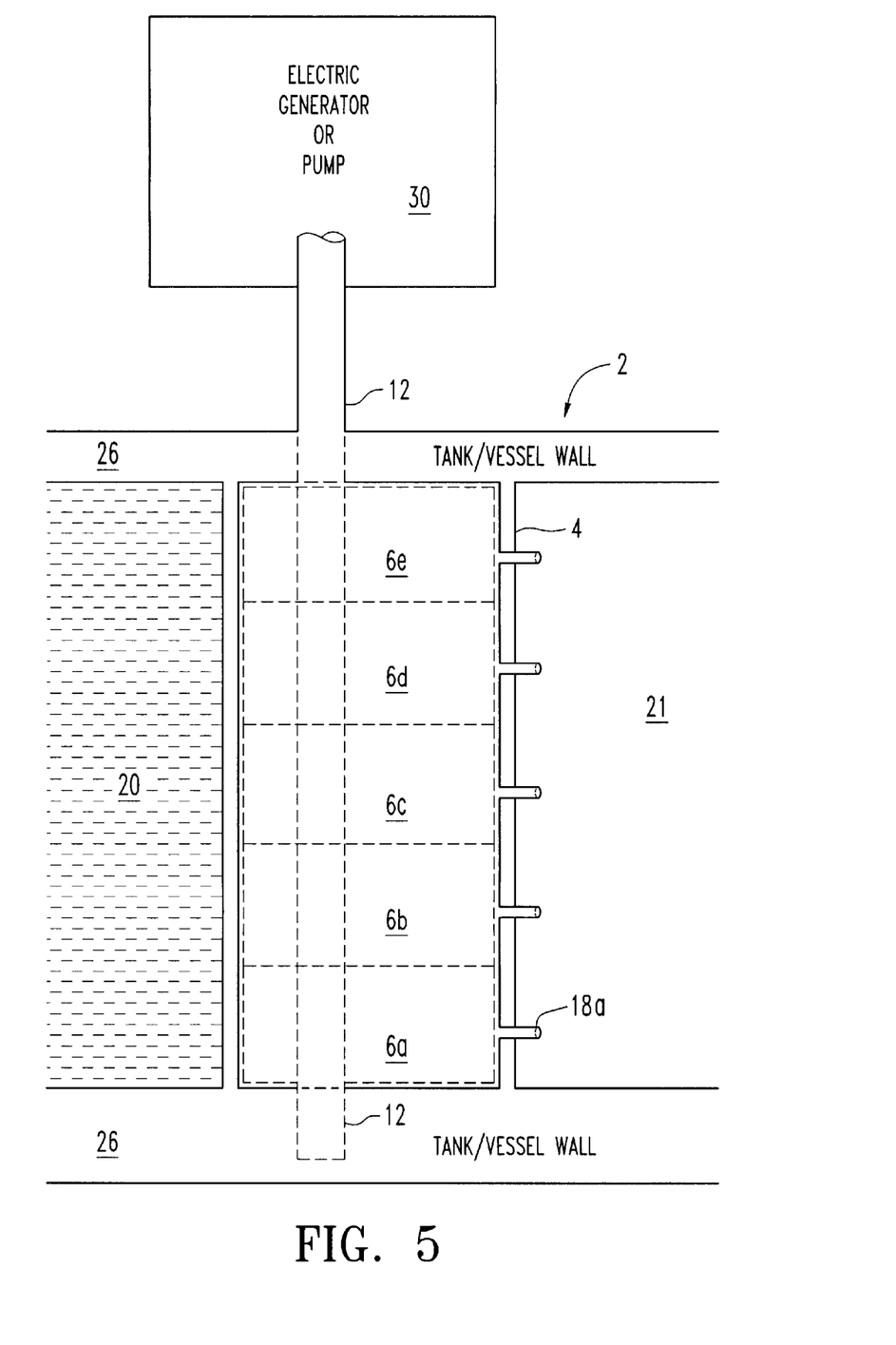
FIG. 5 is a top view showing a series of rotors in a generator housing.

FIG. 5 is a view of water pressure generator 1 taken along the section line AA seen in FIG. 1. FIG. 5 shows a series of five rotors 6a–6e. High pressure section 20 will supply high-pressure water through inlets 16 (hidden from view in FIG. 5), to rotate rotors 6a–6e prior to the high pressure being released through outlets 18 as described below. FIG. 5 illustrates how the length and number of rotors 6 may vary from embodiments such as seen in FIG. 2. It is envisioned that the embodiment in FIG. 5 will have power shaft 12 extend beyond walls 26 of pressure vessel 2 to a piece of equipment 30 such as a generator or pump or provide the mechanical drive for a hybrid mobile vehicle. It can be seen how the power stored in the high-pressure water may be recovered when used to rotate power shaft 12 and drive equipment 30.

Figures 6A, 6B:
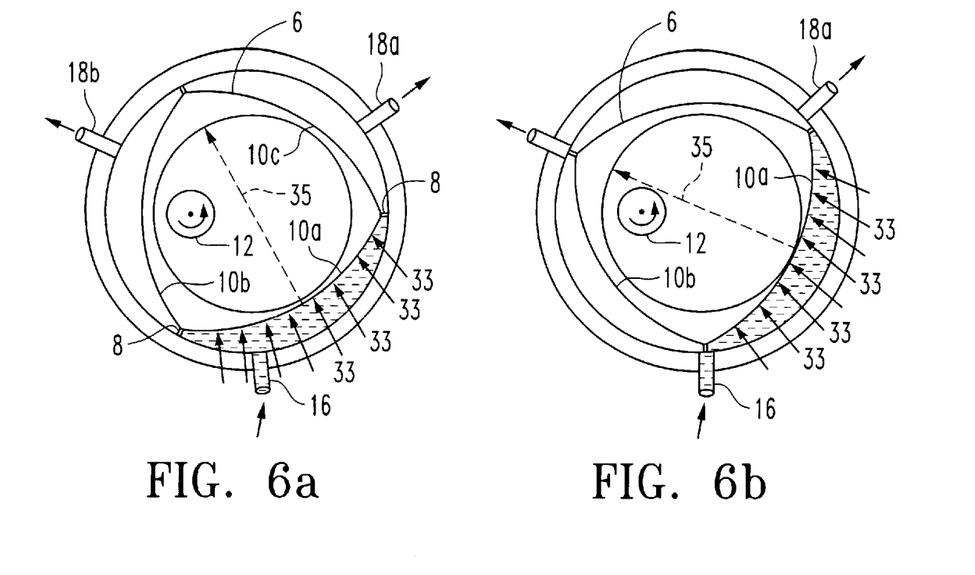
FIGS. 6a–6d illustrate the rotor in several different positions as the rotor turns in the generator housing.
Figures 6C, 6D:
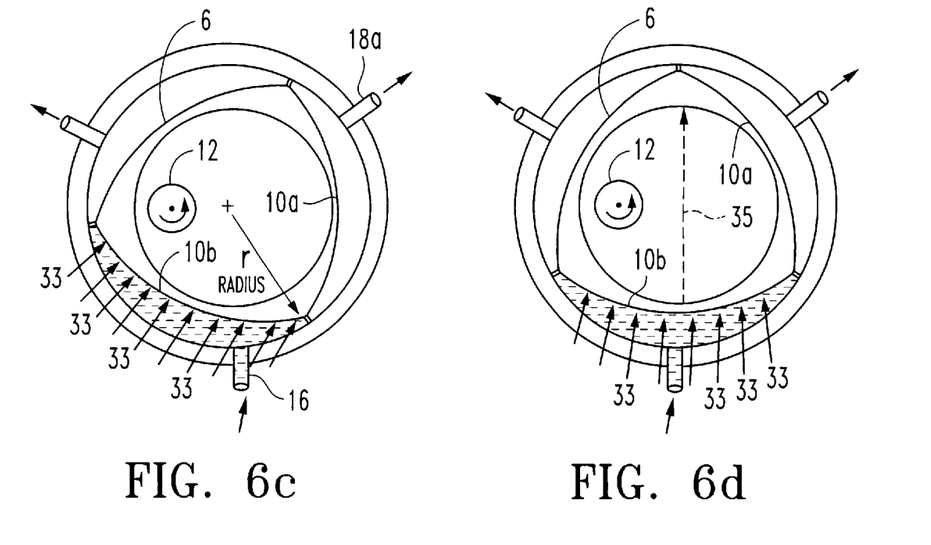

The operating principle of generator 1 is best understood with reference to FIGS. 6a–6b. In FIG. 6a, high pressurize water enters inlet 16 and acts against side 10a of rotor 6 as suggested by force arrows 33. Seals 8 act to prevent the high-pressurized water from reaching outlets 18a or 18b. Therefore, water acting on surfaces 10b and 10c of rotor 6 is at the lower pressure of section 21 with which outlets 18a and 18b communicate (as seen in FIG. 1). The higher-pressure acting on rotor surface 10a will have a resultant force 35 represented by a broken arrow line. It can be seen that the resultant force 35 will create a moment arm around power shaft 12, thereby transferring torque to power shaft 12. In this manner, the pressure acting on surface 10a of rotor 6 will continue to impart torque to power shaft 12 as long as surface 10a is exposed to high pressure water. FIG. 6b shows the seals 8 just before passing inlet 16 and outlets 18. At this point, high-pressure water is still acting upon surface 10a. However, as soon as the seals 8 pass the respective inlet 16 and outlets 18, the water acting against surface 10a will equalize to the lower pressure in section 21 (see FIG. 1) and higher pressure water from inlet 16 will begin action against surface 10b as seen in FIG. 6c. This rotation is shown continuing in FIG. 6d.

As mentioned above, there are certain positions of rotor 6 which apply more torque to power shaft 12 than other positions. This can be seen in comparing FIG. 6b with FIG. 6d. In FIG. 6b, the resultant force 35 passes very close to the center of power shaft 12. Therefore, there is a shorter moment arm and less torque is generated. On the other hand, when rotor 6 is in the position shown in FIG. 6d, there is a larger moment arm transferring a corresponding larger torque to power shaft 12. It is for this reason that the series of rotors 6 seen in FIG. 2 have angular offsets. If the rotor 6b in FIG. 2 is in a position equivalent to FIG. 6b, there will be little torque transferred to power shaft 12 by rotor 6b. However, rotor 6a will at this point be in a position similar to FIG. 6d and therefore be transferring much greater torque to power shaft 12. By establishing the series of rotors 6 at different angular offsets, it is assured that at least one rotor 6 will always be transferring torque to power shaft 12.

Figure 7:
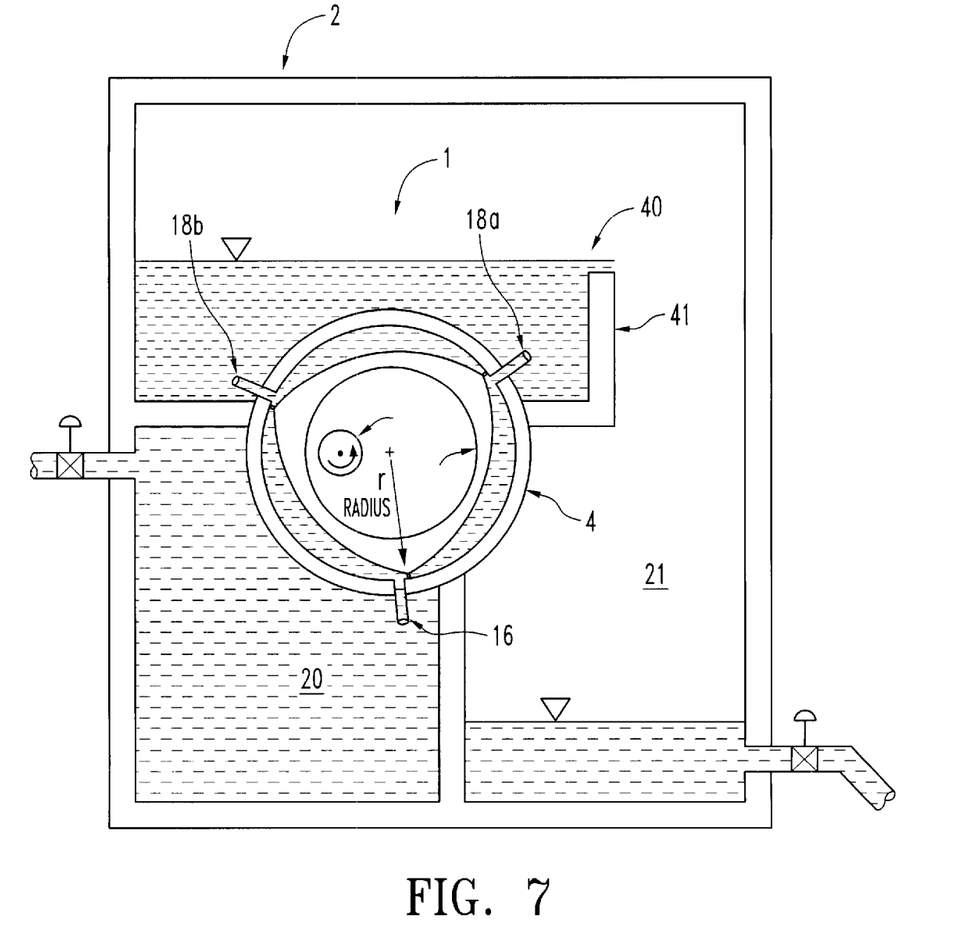
FIG. 7 is an alternative method of employing the water pressure driven generator.

A slight modification to the pressure vessel 2 enclosing water pressure driven generator 1 is seen in FIG. 7. Pressure vessel 2 includes an equalization basin 40 formed by sidewall 41 extending upwards above the height of outlets 18. Because some leakage at seals 8 is probable, at least some water will normally flow from outlets 18. In the embodiment of FIG. 1, water-exiting outlet 18a is deposited at the bottom of section 21. However, because the outlet 18b in FIG. 1 is open to the pressurized air in section 21, it may come to pass that as a seal 8 traverses outlet 18b, some air will be forced below outlet 18b. This is generally not considered favorable to optimal operation of generator 1. The basin 40 in FIG. 7 eliminates this concern by insuring outlet 18b is always submerged in water and thus, cannot draw any air into the generator housing 4.

Although certain preferred embodiments have been described above, it will be appreciated by those skilled in the art to which the present invention pertains that modifications, changes, adaptations, and improvements may be made without departing from the spirit of the invention defined by the claims. For example, while rotor 6 has been shown having a trocoidal shape, many other shapes of rotors are possible such as round rotors, elliptical rotors, or other rotor configurations. Additionally, the source of pressurized water for generator 1 does not need to be a commercial or residential water line. It is envisioned that a high-pressure pump could be attached to the generator's water inlet and that significant power and speed could be obtained from generator 1. In some applications, generator 1 could replace a conventional internal combustion engine. One such application would be in hybrid mobile vehicles where the hybrid vehicle utilizes an alternative power source for water (or another fluid) pressure and for water recirculation. In such a hybrid mobile vehicle, water pressures of 100 psi or more could be employed. Also, the invention is readily adaptable for use in generating power at any decentralized site where pressurized water (or another fluid) is made available. All such modifications, adaptations, changes, and improvements are intended to come within the scope of the present invention.

I claim:

1. A fluid pressure driven generator comprising:
   a. a substantially circular generator housing;
   b. a rotor positioned within said housing and having an internal offset gear;
   c. a power shaft having a spur gear engaging said internal offset gear;
   d. a high pressure inlet formed in said housing; and
   e. a low-pressure outlet formed in said housing.

2. The fluid pressure driven generator according to claim 1, wherein said rotor is a trocoidal cylinder.

3. The fluid pressure driven generator according to claim 2, wherein said trocoidal cylinder has three apices and a seal is formed between each of said apices and an inside surface of said generator housing.

4. The fluid pressure driven generator according to claim 2, wherein said trocoidal cylinder has substantially hollow center cavity and said power shaft extends through said cavity.

5. The fluid pressure driven generator according to claim 1, wherein a plurality of rotors are placed in series.

6. The fluid pressure driven generator according to claim 5, wherein said each of said plurality of rotors has an angular offset from its adjacent rotor.

7. The fluid pressure driven generator according to claim 1, wherein said high-pressure inlet is connected to source of pressurized fluid having a head of approximately 50 psi to approximately 120 psi.

8. The fluid pressure driven generator according to claim 1, further including two low pressure outlets.

9. A fluid pressure driven generator comprising:
   a. a generator housing;
   b. a rotor positioned within said housing and having an internal offset gear;
   c. a power shaft having a spur gear engaging said internal offset gear;
   d. a high pressure inlet formed in said housing;
   e. at least two low-pressure outlet formed in said housing; and
   f. an equalization basin formed above at least one of said low pressure outlets in order to submerge said outlets.

10. The fluid pressure driven generator according to claim 8 wherein said generator housing has a substantially round inner surface.

11. The fluid pressure driven generator according to claim 3, wherein said seal includes a rectangular gasket.

12. The fluid pressure driven generator according to claim 11, wherein said seal includes a membrane flap connected adjacent said rectangular gasket.

13. The fluid pressure driven generator according to claim 5, wherein a divider is positioned between and connected to said rotors and said divider engages the sides of said housing.

14. The fluid pressure driven generator according to claim 13, wherein said housing includes a bearing track with ball bearings positioned therein and said divider is positioned within said bearing track to rotate on said ball bearings.

15. The fluid pressure driven generator according to claim 14, wherein a gasket material is positioned between said divider and sides of said bearing track.

16. The fluid pressure driven generator according to claim 1, wherein the pressurized fluid driving the generator is a liquid.

17. The fluid pressure driven generator according to claim 16, wherein the pressurized liquid driving the generator is water.

18. A fluid pressure driven generator comprising:
   a. a pressure chamber having a high fluid pressure section and a low fluid pressure section;
   b. a generator housing positioned within said pressure chamber;
   c. a rotor positioned within said generator housing, said rotor having an internal offset gear;
   d. a power shaft extending though said rotor, said power shaft having a spur gear engaging said internal offset gear;

e. a high pressure inlet communicating between said high fluid pressure section and said generator housing; and f. a low pressure outlet communicating between said low fluid pressure section and said generator housing.

19. The fluid pressure driven generator according to claim 18, wherein the pressurized fluid driving the generator is water.

20. A fluid pressure driven generator comprising:

a. a high fluid pressure chamber and a low fluid pressure chamber;

b. a generator housing positioned in fluid communication with said pressure chambers;

c. a rotor positioned within said generator housing, said rotor having an internal offset gear;

d. a power shaft extending though said rotor, said power shaft having a spur gear engaging said internal offset gear;

e. a high pressure inlet communicating between said high fluid pressure chamber and said generator housing; and f. a low pressure outlet communicating between said low fluid pressure chamber and said generator housing.

21. The fluid pressure driven generator according to claim 20, wherein said generator operates from a pressure differential of a substantially incompressible fluid with no significant fluid mass flow.

* * * * *